Jan. 6, 1942.  H. A. ANDERSEN  2,269,240
RECORDING INSTRUMENT
Filed Dec. 1, 1939

Inventor:
Henry A. Andersen,
by Harry E. Dunham
His Attorney.

Patented Jan. 6, 1942

2,269,240

UNITED STATES PATENT OFFICE 2,269,240

RECORDING INSTRUMENT

Henry A. Andersen, Swampscott, Mass., assignor to General Electric Company, a corporation of New York Application December 1, 1939, Serial No. 307,093

2 Claims. (Cl. 234—70)

My invention relates to recorders and concerns particularly curve drawing, measuring and indicating instruments of the type not using a pen or an ink reservoir.

My invention is particularly applicable to recorders of the type having a moving chart, a marking sheet or ribbon along the surface of the chart, a deflecting pointer, instrument arm or stylus, movable along the surface of the chart, a platen, and a striker for driving the other parts against the platen in order that the portion of the surface of the chart immediately adjacent the pointer is brought in contact with the marking material to produce a mark on the chart representing the position of the pointer and thus representing the measurement to be recorded.

My invention concerns particularly recorders of the type disclosed in the copending application of Ralph G. Arey, Serial No. 200,707, filed April 7, 1938, and assigned to the same assignee as the present application, in which the marking ribbon and the stylus or movable instrument arm are placed on opposite sides of the chart in order to prevent soiling of the stylus by the marking material and the consequent sticking of the stylus. Such recorders require relatively little servicing since no ink reservoirs are required, and among others, they also have the advantages of producing a record on the top surface of the paper, thus making the record clear and legible, and of having an instrument pointer contained within the casing behind the chart, thus making the construction highly compact and rugged.

Since the pointer in such recorders is behind the chart, it is not visible for giving continuous indications of the measured value. Furthermore, the scale plate on the back of which the platen is mounted and behind which the record is produced, of necessity has a finite width between the platen and the edge of the scale plate (at least half the width of the marking ribbon) under which the latest part of the record is concealed, so that the indication of the instrument can not be determined until sufficient time has elapsed for the portion of the chart bearing the record of the desired indication to move out from behind the scale plate.

It is an object of my invention to produce an indicating and recording instrument which, while retaining all the advantages of the construction described in the aforesaid Arey application, also continuously produces indications of the measured value at the moment.

Other and further objects and advantages will become apparent as the description proceeds.

Figure 1:
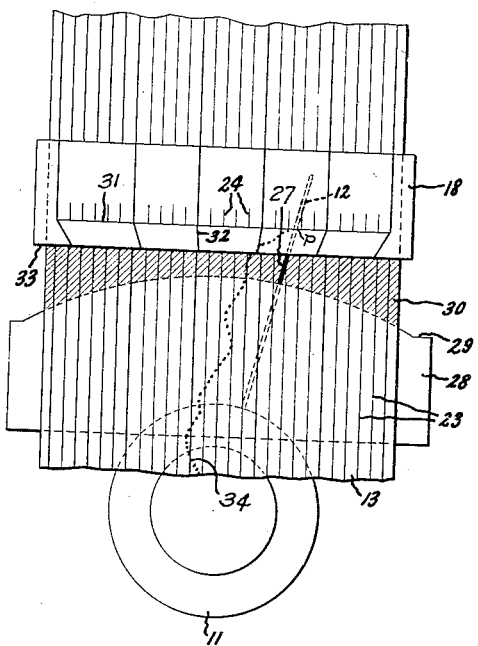
Figure 2:
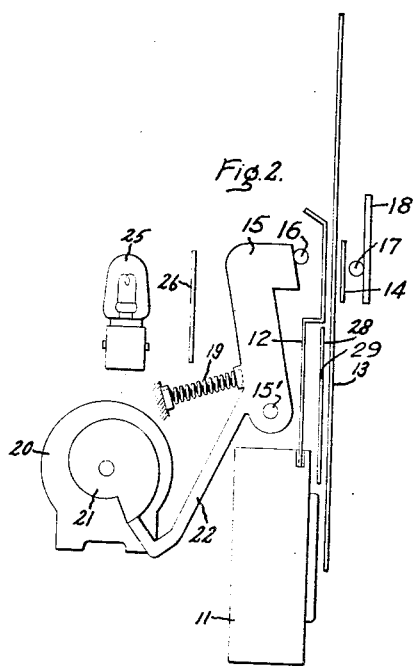

My invention will be understood more readily from the following detailed description when considered in connection with the accompanying drawing and those features of the invention which are believed to be novel and patentable will be pointed out in the claims appended hereto. In the drawing, Fig. 1 is a partial front elevation of one embodiment of my invention in which the deflecting measuring instrument for producing the indications is represented schematically, and Fig. 2 is a side elevation, shown schematically, of the mechanism in the recording instrument represented in Fig. 1. Like reference characters are utilized throughout the drawing to designate like parts.

In the embodiment illustrated, there is a deflecting indicating instrument 11 having a movable pointer or stylus 12 which deflects in accordance with variations in a measurement to be indicated and recorded, and there is a movable strip chart 13 upon which the indications are recorded to produce a record curve. It will be understood that conventional means, not shown, may be provided for causing the strip chart 13 to travel in a downward direction at a uniform rate of speed. For producing the markings on the front surface of the strip chart 13 there is a strip or a sheet of marking material 14, such as a typewriter ribbon, for example, extending transversely across the strip chart 13 and in front of it. The record is produced by bringing the proper portion of the strip chart 13 in contact intermittently with the marking ribbon 14. For this purpose a motor driven reciprocating striker 15 is provided carrying a striker bar 16 extending transversely across the strip chart 13 and located in back of the deflecting pointer 12 for intermittently driving the latter against the chart. The striker 15 is pivoted at 15'. To provide the necessary support for the ribbon 14 and the strip 13 when the pointer 12 is struck by the striker bar 16, and in order to cause a sharply defined mark to be made on the strip 13, a platen 17 with a narrow or line edge is provided which extends transversely across the strip chart 13 in front of the marking ribbon 14. The platen 17 may be supported on the back of a scale plate 18.

For causing the striker bar 16 to be given sharp blows intermittently, a spring 19 may be provided which tends to drive the striker 15 forward around the pivot 15' and has the necessary energy stored therein by means of a motor 20, which moves the striker 15 backwards by means of a cam 21 cooperating with a cam follower 22 secured to the striker 15. The shape of the cam 21 is such that the striker bar 16 moves forward abruptly to strike a sharp blow. As the pointer 12 is flexible and normally spaced from the chart 13, the ribbon 14 is normally spaced from the chart 13, and the parts come in contact only when the sharp blow is struck by the striker 16, there is no danger of record smudging.

It will be apparent that as the strip 13 travels along and as the pointer 12 deflects in accordance with variations in measured value, marks will be produced intermittently upon the front surface of the strip chart 13 to give records of the measured values at successive instants, and thus produce a record curve 34. These marks are made at the intersections of the relatively sharp-edged pointer 12 and platen 17. It will be understood that the strip chart 13 may be provided with suitable vertical graduation lines 23, which may also carry numerical calibrations or, if desired, a scale 24 may also be mounted upon or marked upon the front surface of the scale plate 18 with divisions corresponding to the spacing between the parallel graduation lines 23 of the strip chart 13 and also carrying suitable numerical calibrations, not shown. As soon as the record curve emerges from behind the scale plate 18 the measured values at the times corresponding to longitudinal distances along the strip chart 13 may be determined by reference to the graduation lines 23 and the corresponding divisions and numerical calibrations of the scale 24. However, the portion of the apparatus thus far described does not permit observance of the measured value at the moment since the portion of the record curve being made at any moment is concealed behind the scale plate 18. No matter how close the platen 17 might be to the lower edge of the scale plate 18, a finite time is required for the last point of the record curve to emerge sufficiently to enable the value recorded to be read. In practice it is advisable to have the center line of the marking ribbon at about the height of the platen 17. Nothing would be gained by having the distance between the platen 17 and the lower edge of the scale plate 18 less than half the ribbon width, since this much of the record would be concealed by the ribbon anyway. In order to make the position of the pointer 12 visible at the moment the latest mark of the record curve is being produced, I provide a light source which may take the form of a lamp 25 behind the pointer 12 so as to cast a shadow 27 upon the strip chart 13 which is sufficiently translucent to permit the shadow to be observed whenever the pointer 12 is brought in contact with the back surface of the strip chart 13. For this purpose, however, ordinary paper strip chart is sufficiently translucent. For making the shadow of uniform appearance regardless of the angular position of the pointer 12, I preferably provide a translucent plate 26 between the lamp 25 and the pointer 12 so that the shadow cast upon the strip chart 13 is from a large luminous surface having substantially the same width as the strip chart. It will be observed that with this arrangement focussing means for directing light beams or for producing a sharp image on the chart 13 are unnecessary because the pointer 12 comes in direct contact with the strip 13 for producing a sharp shadow image 27 to give a finite indication. If desired, an opaque plate 28 may be interposed between the translucent plate 26 and the strip chart 13, the plate 28 having a top edge 29 of suitable shape to leave only an illuminated portion 30, shown in Fig. 1.

The line 31 of the scale 24 is in alinement with the sharp mark-producing edge of the platen 17 so that the mark when produced is at the point of intersection P of the line 31 and the pointer 12, as indicated in Fig. 1. However, owing to the fact that the deflecting arm 12 slants toward the pivot point at the center of the instrument 11, the shadow indication 27 is not in vertical alinement with the point P on the scale 24 representing the measured value. For reading the indications produced by the shadows 27, I provide a separate set of scale divisions 32 which intersect the lower edge 33 of the scale plate 18 at the points corresponding to the positions of the pointer 12 for the readings indicated, and I continue the scale divisions 32 obliquely to the corresponding points in the scale 24 so that the positions of the shadow indications 27 may be observed with respect to the scale divisions 32, and numerical values may be obtained from the scale 24.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a recorder of the intermittent tapping type, having a translucent chart with parallel-line graduations and a movable pointer behind the chart adapted to be driven against the chart intermittently for making a record thereon, the combination with said pointer and chart of a light source behind said pointer and chart for causing a shadow of the pointer to be cast upon the chart for indicating pointer position, a scale plate in front of said chart adapted to cooperate with said chart graduations and the record thereon and also with said pointer shadow to provide readings or measurements of quantities indicated by the pointer and recorded on the chart, a scale on said scale plate having scale divisions spaced like the chart graduations in accordance with the points of contact of said pointer with said chart behind said scale plate corresponding to various measured values, and a set of principal scale divisions between said scale, and the edge of said scale plate, said principal scale divisions being spaced in accordance with the points of intersection of the pointer with the scale plate edge, said principal scale divisions being slanted from the edge of said scale plate to the divisions of corresponding value of said first mentioned scale for guidance in the alignment of the pointer shadow with the proper scale division of said first-mentioned scale.

2. An indicating and recording measuring instrument comprising a movable translucent chart and a transversely movable pointer behind the chart, a light source behind the pointer and chart, a scale plate in front of said chart with a platen on the back of the scale plate, means for driving said pointer and chart together against the platen on the back of said scale plate for making a record on the chart, said light source being placed to illuminate the back surface of the chart adjacent the scale plate, whereby a shadow of said pointer is visibly cast on said chart whenever the pointer is driven against the chart in order to produce an indication of the measured value before the mark corresponding thereto has emerged from behind the scale plate.

HENRY A. ANDERSEN.